July 12, 1938.  H. GOLDEN  2,123,527
DEVICE FOR ATTACHING LICENSE PLATES
Filed Sept. 15, 1937
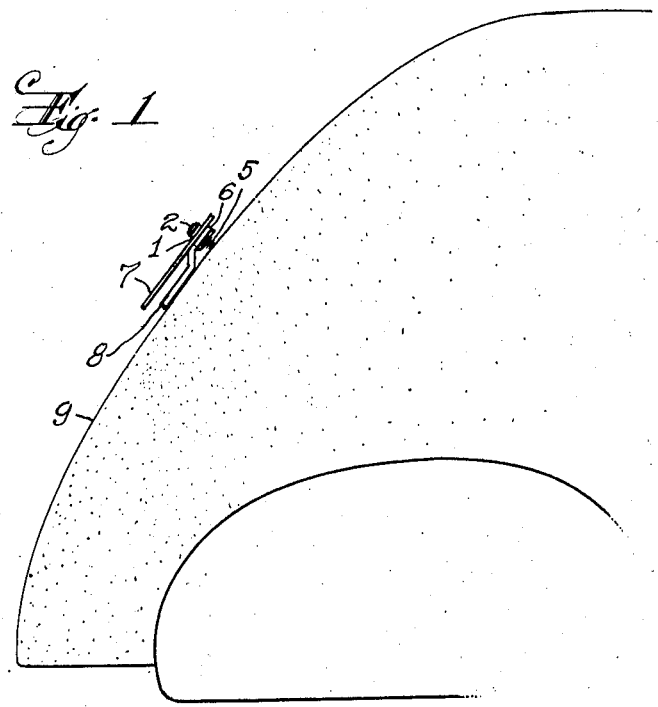
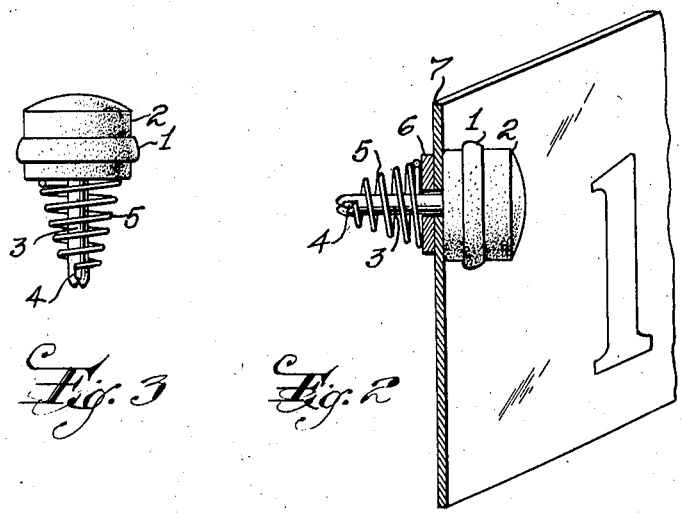
INVENTOR
Harry Golden
BY C. James Cottrell
ATTORNEY Patented July 12, 1938

2,123,527

UNITED STATES PATENT OFFICE 2,123,527

DEVICE FOR ATTACHING LICENSE PLATES

Harry Golden, New York, N. Y., assignor to Magna Products Corp., New York, N. Y.

Application September 15, 1937, Serial No. 164,047

3 Claims. (Cl. 85—5)

This invention relates to devices for attaching license plates to brackets on automobiles.

It is common practice at present, especially on automobiles of the streamline type, to support the license plate on a bracket attached to the rear wall of the automobile or to a trunk cover. Inasmuch as such rear walls or trunk covers are inclined forwardly, the license plate will also be inclined to the vertical, as such plates are mounted parallel to the supporting surface.

The usual license plate supporting bracket comprises a bar mounted flat against the supporting surface, the bar having attached thereto a cross bar to which the license plate is secured. Inasmuch as the space between the license plate and the supporting surface is not more than about one-half inch, there is not much room for manipulating a bolt and nut for securing the plate to the cross bar, and the securing operation is usually performed with appreciable difficulty. Also, the arrangement makes it impractical to provide ornamental reflecting devices on the bolts.

It is, therefore, an object of this invention to provide a device for securing license plates to brackets which enables the securing operation to be performed entirely upon one side of a license plate, and regardless of the space between the plate and the supporting surface.

A further object is the provision of a device by means of which a license plate can be readily and conveniently secured to a bracket without necessitating the use of tools of any kind.

A further object of the invention is to provide a device for securing a license plate readily and conveniently to a supporting bracket without the use of tools, and which device is capable of carrying ornamental reflecting devices without interfering with the securing function.

These and other objects are attained by the novel construction, combination and arrangement of parts hereinafter described and shown in the accompanying drawing, constituting a material part of this disclosure, and in which:

Fig. 1 is a side elevational view of a part of the rear of an automobile showing a license plate secured thereto by means of my device.

Fig. 2 is an enlarged view showing the manner in which the device is used to secure a plate to a cross bar.

Fig. 3 is an elevational view of the securing device.

Referring to the drawing, the device is shown to include a head 1, having one side thereof recessed to support an ornamental member, such as a glass reflecting button 2. A pin 3 is secured to the head 1, and extends from the other side thereof. The pin 3 has the free end thereof slotted at 4 to receive the small end of a conical compression spring 5. The slotted end of the pin 3 is upset to hold the end of the spring tightly in the slot, while the other end of the spring is unattached and abuts the underside of head 1.

In Figs. 1 and 2, is shown a cross bar 6 to which is secured a license plate 7, the cross bar being supported by a bracket 8 mounted on the rear wall 9 of an automobile.

In securing a plate to a cross bar, the slotted end of pin 3 is inserted in the usual holes provided in license plates and cross bars, and the conical coiled spring 5 is "screwed" through the holes until the underside of head 1 abuts the license plate, and the large end of the coiled spring abuts the cross-bar as shown in Fig. 2.

From the above description it will be seen that there has been provided a simple device for rapidly and conveniently attaching license plates to cross bars. Not only is the license plate held firmly in position, but it is prevented from vibrating and rattling due to the pressure of the coiled spring. No tools are required; and the device, due to its peculiar construction is baffling to persons who may attempt to steal license plates.

The foregoing disclosure is to be regarded as descriptive and illustrative only, and not as restrictive or limitative of the invention of which obviously an embodiment may be constructed including modifications without departing from the general scope herein indicated and denoted in the appended claims.

Having thus described my invention, what I claim as new and desire to secure by Letters Patent, is:

1. A device for securing a license plate to a cross bar, comprising a head, a pin of uniform diameter projecting from one side of the head and having a slot in the free end thereof, and a coiled conical spring encircling said pin, the diameter of the smallest coil of the spring being greater than the diameter of the pin, said spring having the end thereof adjacent the smallest coil held tightly in said slot, said spring being adapted to be threaded through the license plate and cross bar.

2. A device for securing a license plate to a cross bar, comprising a head, a pin of uniform diameter projecting from one side of the head, and a coiled conical spring encircling said pin, said spring having the end thereof adjacent the smallest coil attached to the free end of the pin, the diameter of the smallest coil of the spring being greater than the diameter of the pin, said spring being adapted to be threaded through the license plate and cross bar.

3. A device for securing a license plate to a cross bar, comprising a head, a pin of uniform diameter attached to and projecting from one side of the head, a coiled conical spring encircling said pin, said spring having the end thereof adjacent the smallest coil attached to the pin, the diameter of the smallest coil of the spring being greater than the diameter of the pin, and an ornamental button supported by the head, said spring being adapted to be threaded through the license plate and cross bar.

HARRY GOLDEN.